United States Patent [19]
Okubo et al.

[11] Patent Number: 5,680,704
[45] Date of Patent: Oct. 28, 1997

[54] CUTTING CHIP SUCTION DEVICE FOR USE WITH CUTTING TOOL

[75] Inventors: Hideki Okubo; Shoji Atono, both of Anjo, Japan

[73] Assignee: Makita Corporation, Anjo, Japan

[21] Appl. No.: 613,176

[22] Filed: Mar. 8, 1996

[30] Foreign Application Priority Data

Mar. 10, 1995 [JP] Japan .................................. 7-051182

[51] Int. Cl.$^6$ ..................................................... B27B 19/09
[52] U.S. Cl. ................................................. 30/124; 30/392
[58] Field of Search ....................... 83/168, 100; 30/124, 30/374, 373, 392–394, 376

[56] References Cited

U.S. PATENT DOCUMENTS

| | | | |
|---|---|---|---|
| 4,090,297 | 5/1978 | Wanner et al. | 30/124 |
| 4,665,617 | 5/1987 | Maier et al. | 30/374 |
| 4,822,219 | 4/1989 | Wood et al. | 83/100 X |
| 4,837,935 | 6/1989 | Maier et al. | 30/392 |

FOREIGN PATENT DOCUMENTS

| | | |
|---|---|---|
| 2546527 | 4/1977 | Germany. |
| 7919565 | 7/1979 | Germany. |
| 3703063 | 2/1987 | Germany. |
| 8902928 | 3/1989 | Germany. |
| 6-75705 | 10/1994 | Japan. |

*Primary Examiner*—Douglas D. Watts
*Attorney, Agent, or Firm*—Dennison, Meserole, Pollack & Scheiner

[57] ABSTRACT

A cutting chip suction device is adapted for sucking cutting chips produced when a work is cut by a blade of a cutting tool. The device includes a duct and a duct mounting mechanism. The duct has one end connected to a dust collector and having the other end formed with an opening. The duct mounting mechanism is adapted for mounting the duct on the cutting tool and permits the duct to be selectively mounted on the cutting tool in a first position and a second position on both sides of the blade. The opening of the duct in said first and second positions is positioned adjacent a cutting position where the work is cut by the blade.

8 Claims, 6 Drawing Sheets

CUTTING CHIP SUCTION DEVICE FOR USE WITH CUTTING TOOL

BACKGROUND OF THE INVENTION

1. Field of the Invention

The present invention relates to a cutting chip suction device for use with a cutting tool such as a jig saw.

2. Description of the Prior Art

Japanese Laid-Open Utility Model Publication No. 6-75705 discloses a jig saw having a cutting chip suction device shown in FIG. 6 of this application which corresponds to FIG. 1 in the publication. The jig saw has a body 4 for mounting a blade B thereon and has a drive mechanism (not shown) for reciprocally driving the blade B. The body 4 is mounted on a base 5. A chip cover 2 has a substantially U-shaped configuration in plan view and is placed on a base 5 for covering a blade B on its front side and on its both lateral sides. A chip suction nozzle 3 has one end which includes a chip suction opening which is connected to one of the lateral sides of the chip cover 2 in the middle position in the vertical direction. The chip cover 2 is intended to be inverted for changing the position of the chip suction nozzle 3 from one to the other of two lateral sides, so that the chip suction nozzle 3 can be positioned on any one of lateral sides of the blade B with the mounting height held constant.

However, since the chip suction nozzle 3 is positioned in the middle position of the chip cover 2 in the vertical direction, the chip suction opening is positioned away from a cutting position of a work (the position where the blade B intersects the work) by a relatively greater distance in the vertical direction. Therefore, with the conventional device, the cutting chips are sucked by the chip suction nozzle 3 when the cutting chips are floating in the air after they have been blown upwardly from the cutting position. For this reason, the cutting chips which have been once dropped on the base 5 cannot be sucked by the chip suction nozzle 3. Thus, the conventional device involves the problem that the cutting chips cannot be efficiently sucked.

In addition, with the conventional device, since the cutting chips are floated in the air within the chip cover 2 after they have been blown upwardly from the cutting position as described above, the chip cover 2 must be constructed to reliably cover the cutting position on both circumferential side and the upper side thereof. Thus, the lower end of the chip cover 2 is configured such that the lower end abuts on the base 5 so as not to create any gap between the lower end and the base 5. (The upper end is also configured in the same manner as the lower end since the chip cover 2 is intended to be inverted.) As a result, the chip cover 2 hinders an oblique cutting operation with the body 4 laterally inclined relative to the base 5.

SUMMARY OF THE INVENTION

It is, accordingly, an object of the present invention to provide a cutting chip suction device in a cutting tool in which a cutting chip suction duct having a suction opening can be positioned on both sides of a blade with the suction opening positioned adjacent a cutting position where a work is cut by the blade.

It is another object of the present invention to provide such a cutting chip suction device which does not hinder an oblique cutting operation.

According to the present invention, there is provided a cutting chip suction device adapted for sucking cutting chips produced when a work is cut by a blade of a cutting tool, comprising:

a duct having one end connected to a dust collector and having the other end formed with an opening; and a duct mounting mechanism for mounting the duct on the cutting tool;

the duct mounting mechanism permitting the duct to be selectively mounted on the cutting tool in a first position and a second position on both sides of the blade; and the opening of the duct in the first and second positions being positioned adjacent a cutting position where the work is cut by the blade.

With this construction, since the opening of the duct in any of the first and second positions is positioned adjacent the cutting position, the cutting chips can be effectively sucked through the duct.

In addition, since the cutting chips can be sucked immediately after they have been produced, a protector for covering the cutting position can be configured to have sufficient gaps between a base and the protector such that the cutting chips can be sucked through the gaps and that a body of the tool can be laterally inclined without causing interference with the base.

The invention will become more fully apparent from the claims and the description as it proceeds in connection with the drawings.

DETAILED DESCRIPTION OF THE PREFERRED EMBODIMENTS

An embodiment of the present invention will now be described with reference to FIGS. 1 to 5.

Figure 2:
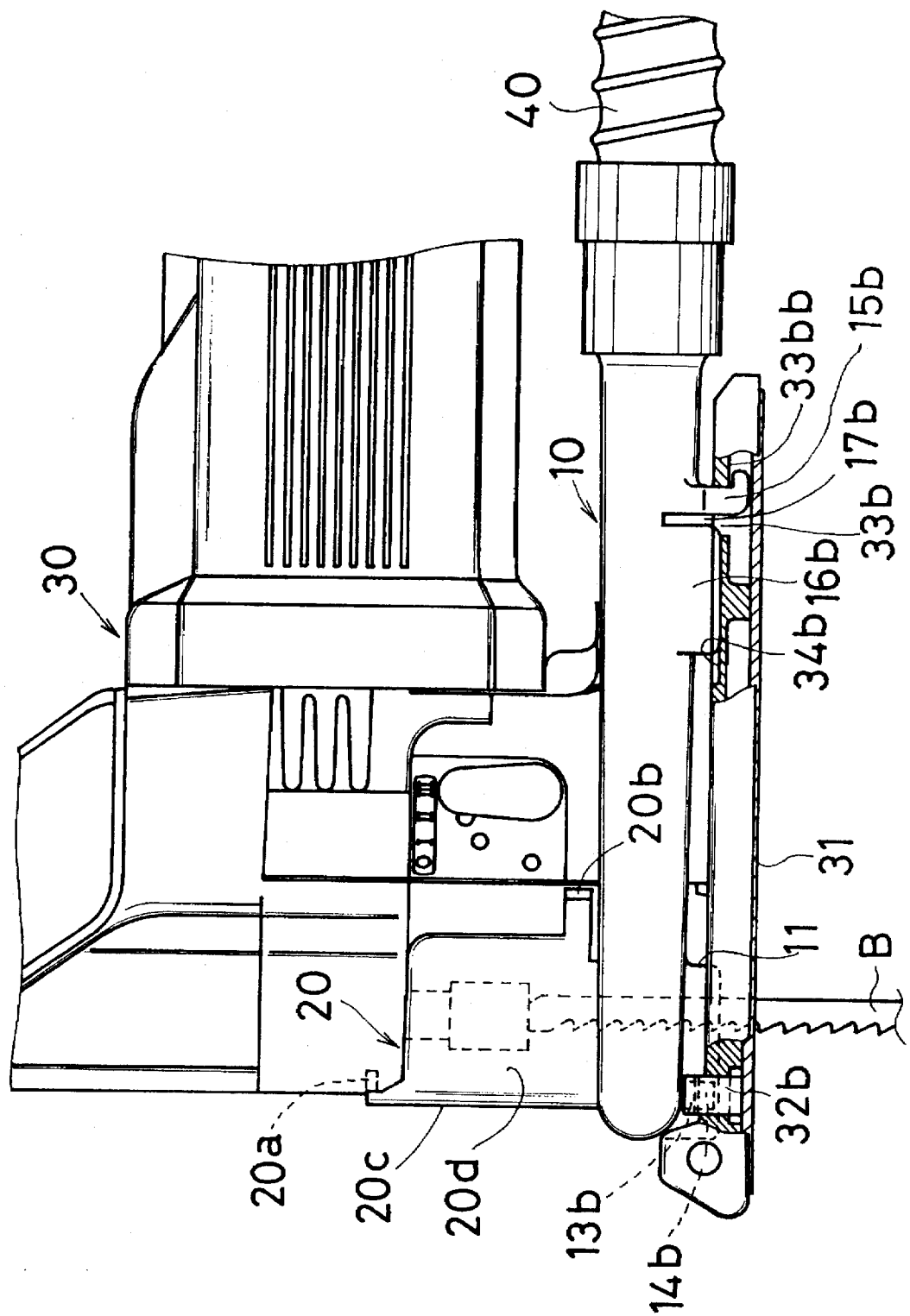
FIG. 2 is a right side view of the essential parts of the jig saw.

A cutting chip suction device of this embodiment is adapted to be mounted on a jig saw. The cutting chip suction device includes a cutting chip suction duct 10 and a duct mounting device for mounting the cutting chip suction duct 10 on the jig saw as will be explained later. As shown in FIG. 2, the cutting chip suction duct 10 is connected to a hose 40 which is in turn connected to a vacuum dust collector (not shown). The jig saw has a body 30 which includes a blade mounting device (not shown) for detachably mounting a saw blade B and which includes a blade drive mechanism (not shown) for vertically reciprocally driving the saw blade B. The body 30 is mounted on a base 31 which is adapted to be placed on a work (not shown).

Figure 3A:
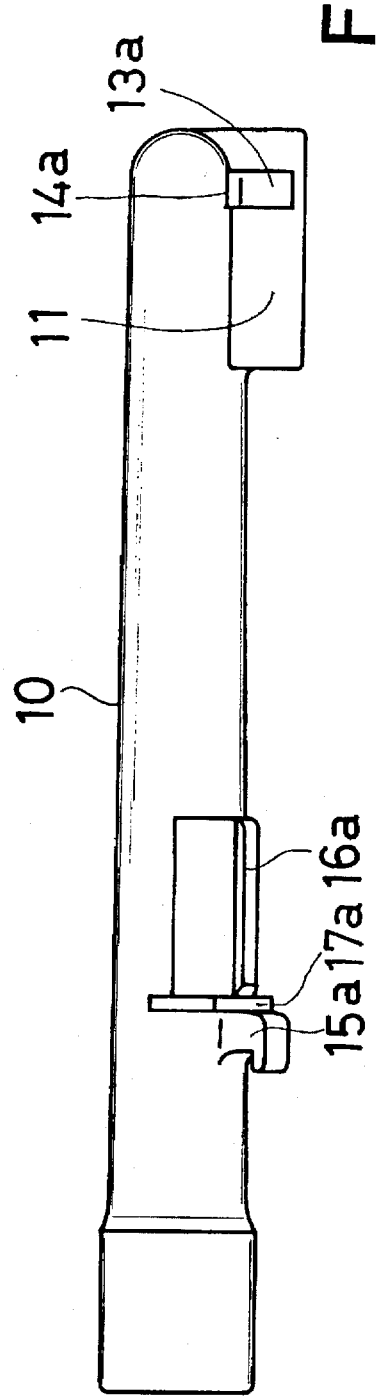
FIGS. 3(A) and 3(B) are a left side view and a front view of a cutting chip suction duct of the device, respectively.
Figure 3B:
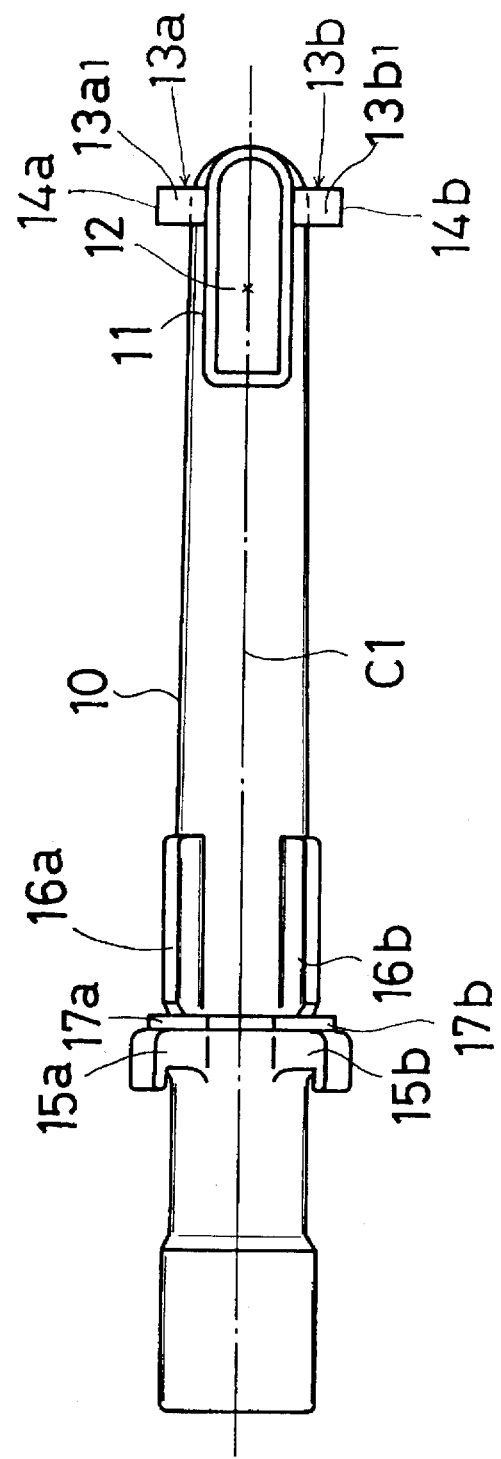

As shown in FIG. 2, the cutting chip suction duct 10 is mounted on the base 31 and extends along and adjacent the upper surface of the base 31. As shown in FIGS. 3(A) and 3(B), the cutting chip suction duct 10 has a substantially cylindrical configuration and has a suction nozzle 11 which is formed on a lateral side of a closed front end of the duct 10 and which has an opening 12 in communication with the interior of the duct 10. The suction nozzle 11 extends in a direction perpendicular to the longitudinal axis of the duct 10, and its opening 12 has a configuration elongated along the longitudinal axis of the duct 10.

Figure 1:
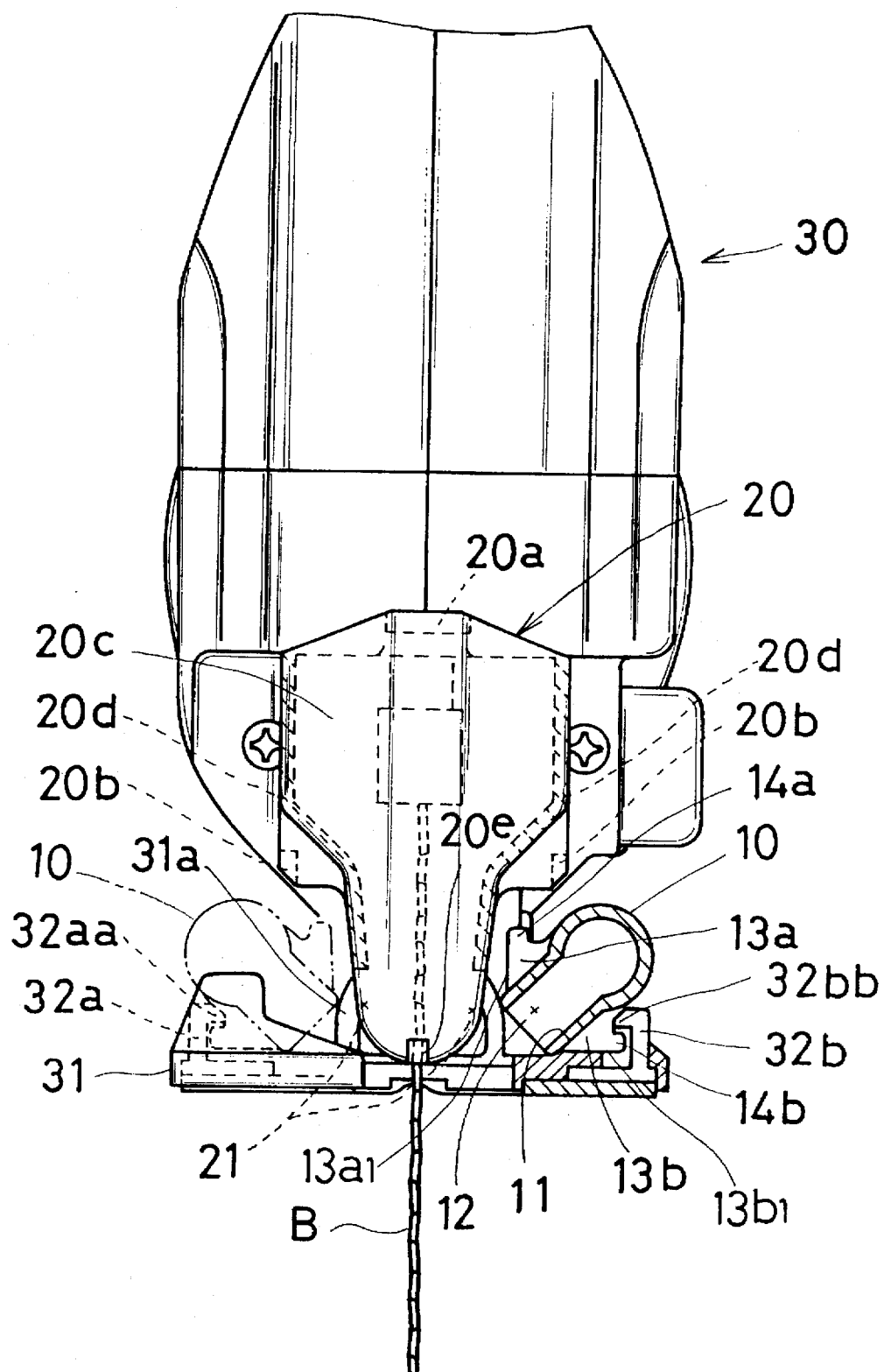
FIG. 1 is a front view of a jig saw incorporating a cutting chip suction device according to an embodiment of the present invention.

As shown in FIG. 3(A), a pair of tabs 13a and 13b are formed on both lateral sides of the nozzle 11. The tabs 13a and 13b are positioned symmetrically with respect to the central axis C1 and extend laterally from the nozzle 11. Here, the central axis C1 corresponds to the longitudinal axis of the duct 10. As shown in FIG. 1, the tabs 13a and 13b have a substantially triangular configuration and have outer edges 13a1 and 13b1, respectively, which are inclined at an angle of 45° relative to the longitudinal axis of the nozzle 11 in opposite directions, so that the outer edges 13a1 and 13b1 are inclined relative to each other at right angles. Further, the tabs 13a and 13b have engaging protrusions 14a and 14b formed continuous with the outer edges 13a1 and 13b1 and extending outwardly in the same direction as the outer edges 13a1 and 13b1, respectively.

Further, a pair of substantially L-shaped hook protrusions 15a and 15b are formed on the lateral surface of a rear portion of the duct 10 in a symmetrical manner with respect to the central axis C1 and are displaced from each other by an angle of 90° in the circumferential direction of the duct 10. Each of the hook protrusions 15a and 15b extends radially outwardly from the duct 10 and has a rearwardly bent end portion. A pair of flat plate-like abutting plates 16a and 16b are formed on the lateral surface of the duct 10 and are positioned forwardly of the hook protrusions 15a and 15b in alignment therewith, respectively, so that the abutting plates 16a and 16b are displaced from each other by an angle of 90°. Each of the abutting plates 16a and 16b has a configuration elongated in the longitudinal direction of the duct 10 and extends radially outwardly from the duct 10. A pair of partition flanges 17a and 17b are formed on the lateral surface of the duct 10 and are positioned between the hook protrusion 15a and the abutting plate 16a and between the hook protrusion 15b and the abutting plate 16b, respectively.

Thus, the engaging protrusions 14a and 14b on the front side, the hook protrusions 15a and 15b, the partition protrusions 17a and 17b and the abutting protrusions 16a and 16b on the rear side are positioned symmetrically with each other with respect to the central line C1, respectively. Here, the engaging protrusion 14a, the hook protrusion 15a, the partition flange 17a and the abutting protrusion 16a are adapted to mount the duct 10 on the right side (as viewed from the front side), while the engaging protrusion 14b, the hook protrusion 15b, the partition flange 17b and the abutting protrusion 16b are adapted to mount the duct 10 on the left side (as viewed from the front side).

Figure 4:
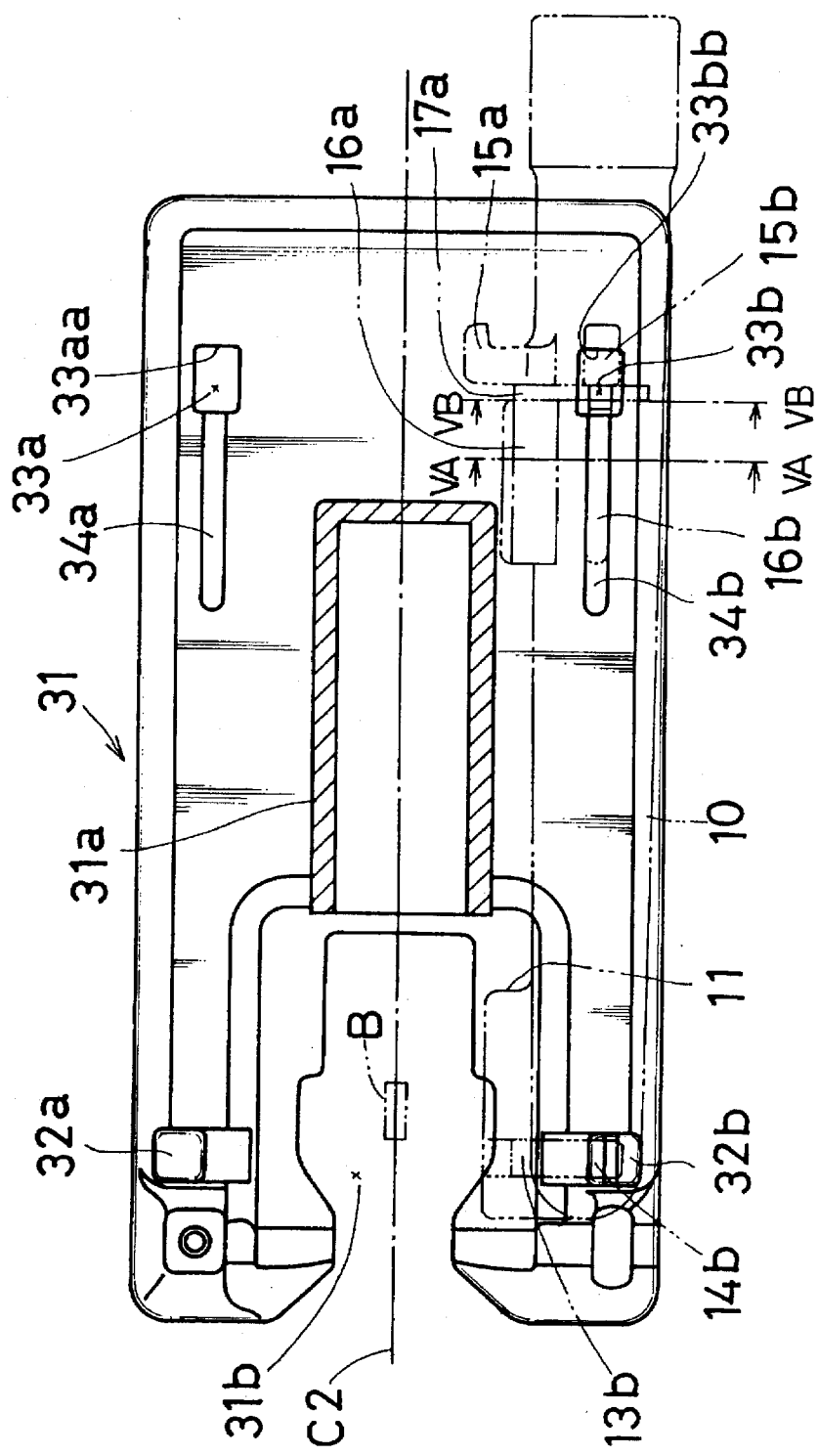
FIG. 4 is a plan view of a base of the jig saw on which the duct is mounted.

As shown in FIG. 4, a pair of hooks 32a and 32b, a pair of engaging holes 33a and 33b, and a pair of recesses 34a and 34b are positioned on both sides of the base 31 in a symmetrical manner with respect to a central line C2 of the base 31, respectively. Here, the central line C2 extends through the blade B. As shown in FIG. 1, the hooks 32a and 32b are fixedly mounted on the front portion of the base 31 on both lateral sides thereof and include engaging claws 32aa and 32bb bent inwardly toward the central line C2, respectively. Here, each of the engaging claws 32aa and 32bb has a guide surface inclined downwardly toward the central line C2 for guiding the engaging protrusion 14a or 14b when the duct 10 is mounted on the base 31. Although, in this embodiment, the hooks 32a and 32b are formed separately from the base 31 and are assembled thereinto, they may be formed integrally with the base 31.

As shown in FIG. 2, the engaging holes 33a and 33b are formed in the rear portion of the base 31 and are adapted to receive the hook protrusion 15a and 15b formed on the rear portion of the duct 10, respectively. Each of the engaging holes 33a and 33b is opened into the inner space formed within the base 31. Engaging edges 33aa and 33bb are parts of the base 31 defining rear edges of the engaging holes 33a and 33b and serve to engage the hook protrusions 15a and 15b, respectively. The recesses 34a and 34b are positioned forwardly of the engaging holes 33a and 33b, respectively, and are formed in a surface plate of the base 31 so as not to extend into the inner space. The recesses 34a and 34b are adapted to receive the abutting protrusions 16a and 16b in such a manner that the abutting protrusions 16a and 16b abut on the bottoms of the recesses 34a and 34b, respectively.

Thus, the tabs 13a and 13b having engaging protrusions 14a and 14b, the hook protrusions 15a and 15b, and abutting protrusions 16a and 16b of the duct 10 cooperate with the hooks 32a and 32b, the engaging holes 33a and 33b, and the recesses 34a and 34b of the base 31 to constitute the duct mounting device.

As shown in FIG. 4, a support 31a is formed centrally of the base 31 for supporting the body 30. Here, the support 31a has a substantially semi-cylindrical configuration (see FIG. 1), so that the body 30 can be inclined laterally along a curved upper surface of the support 31a. A screw (not shown) is provided for fixing the position of the body 30 relative to the support 31a. The front portion of the base 31 has a recess 31b through which the blade B extends. A back-up roller (not shown) for the blade B is also positioned within the recess 31b.

As shown in FIG. 1, a protector 20 is mounted on the front portion of the body 30 and serves to cover the cutting position for preventing the cutting chips from scattering to the outside. The protector 20 has a substantially U-shaped configuration in plan view and has a front plate 20c and a pair of side plates 20d which are connected to the front portion of the body 30 by means of an engaging protrusion 20a formed on the upper portion of the front plate 20c and engaging protrusions 20b formed on the rear ends of the side plates 20d. The lower halves of the side plates 20d are configured such that the distance between the side plates 20d decreases in the downward direction. In addition, the vertical length of the side plates 20d is smaller than that of the front plate 20c, so that gaps 21 are created between the lower ends of the side plates 20d and the base 31. The front plate 20c has a curved lower end which substantially abuts on the upper surface of the base 31. A protrusion 20e is formed on the lower end of the front plate 20c and extends forwardly therefrom to some extent. The protrusion 20e is adapted for registration to an inked line drawn on the work.

With the cutting chip suction device thus constructed, the cutting chip suction duct 10 can be selectively mounted on the jig saw on both lateral sides of the blade B.

In order to mount the duct 10 on the right side as shown by solid lines in FIG. 1, an operator holds the duct 10 such that the duct 10 is inclined downwardly toward the rear end. Then, he inserts the hook protrusion 15b into the right side engaging hole 33b and moves the duct 10 rearwardly, so that the hook protrusion 15b is brought to engage the engaging edge 33bb, thereby mounting the rear portion of the duct 10 on the base 31. The operator thereafter lowers the front end of the duct 10, so that the abutting protrusion 16b is brought to engage the recess 34b and that the right side engaging protrusion 14b is brought to engage the engaging claw 32bb of the hook 32b. More specifically, as the front end of the duct 10 is lowered after the abutting protrusion 16b has been brought to engage the recess 34b, the engaging protrusion 14b abuts on the upper end of the guide surface formed on the engaging claw 32bb. As the duct 10 is further lowered, the front portion of the duct 10 is resiliently bent inwardly along the guide surface since the rear portion of the duct 10 cannot be moved laterally. When the engaging protrusion 14b has been lowered below the engaging claw 32bb, the front portion of the duct 10 immediately recovers its original shape, so that the engaging protrusion 14b is brought to engage the engaging claw 32bb.

The duct 10 is thus mounted on the right side of the base 31. In this mounting position, the opening 12 of the cutting chip suction nozzle 11 is positioned adjacent the cutting position with the nozzle 11 inclined downward by an angle of 45°, so that the cutting chips produced at the cutting position can be sucked by the nozzle 11 through the gap 21 formed between the base 31 and the right side plate 20d. In addition, with this arrangement, the nozzle 11 may suck cutting chips which have not been sucked through the nozzle 11 for the first time but have been deposited on the base after being scattered upward.

Figure 5A:
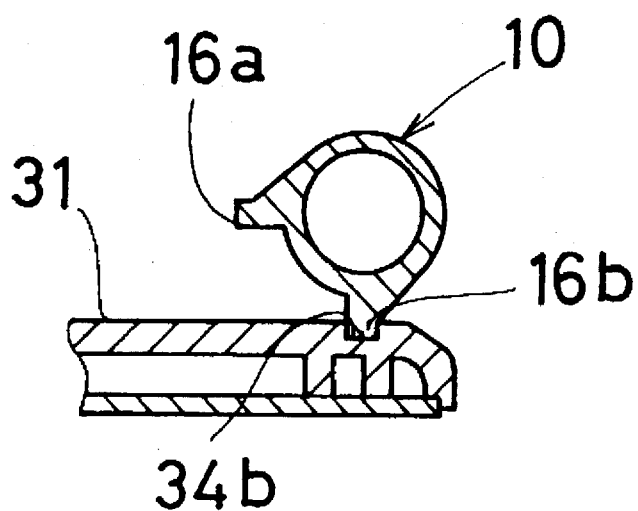
FIGS. 5(A) and 5(B) are sectional views taken along lines VA—VA and VB—VB in FIG. 4, respectively, and showing the mounting state of the duct on the base.
Figure 5B:
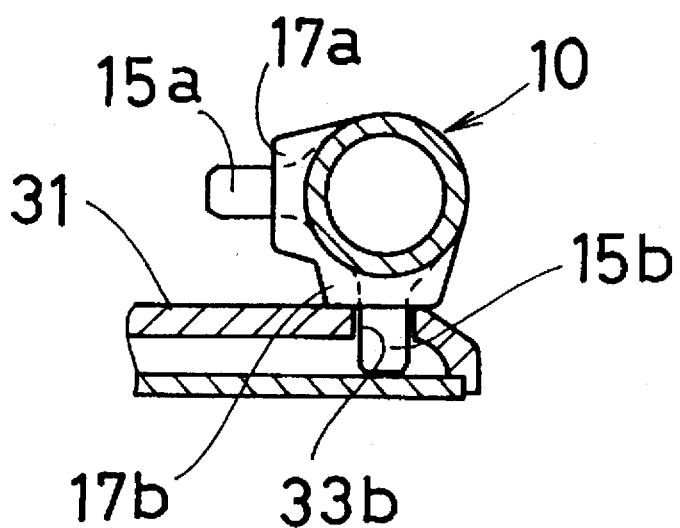
Figure 6:
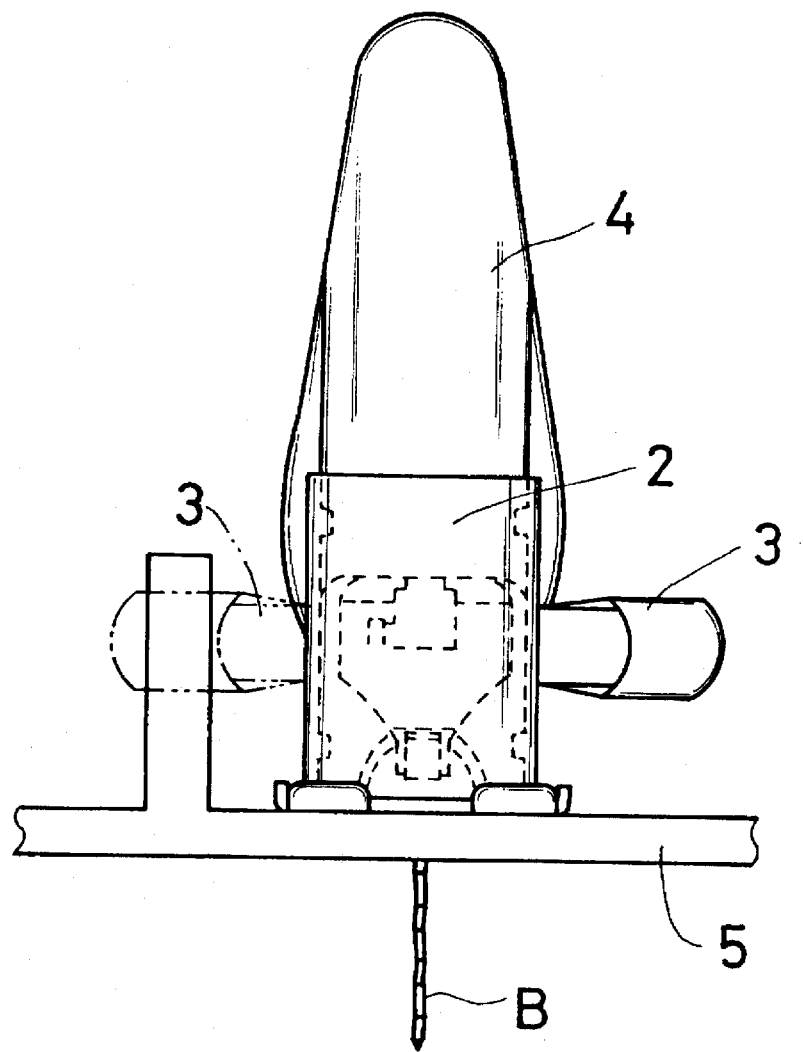
FIG. 6 is a front view of a jig saw incorporating a conventional cutting chip suction device.

Further, in this mounting state, the partition flange in 17b abuts on the upper surface of the base 31 as shown FIG. 5(B), and the outer edge 13b1 of the tab 13b abuts on the upper surface of the base 31 as shown in FIG. 1. Therefore, the duct 10 is positioned stably in the rotational direction around the central line C1.

In order to remove the duct 10 which has been mounted on the right side as described above, the operator pushes the front portion of the duct 10 leftward (toward the blade B) while he presses the front portion downward to some extent, so that the engaging protrusion 14b is disengaged from the hook 32b. The operator then lifts the front portion of the duct 10, so that the hook protrusion 15b can be removed from the engaging hole 33b.

On the other hand, in order to mount the duct 10 on the left side, the tabs 13a having the engaging protrusion 14a, the hook protrusion 15a and the abutting protrusion 16a of the duct 10 cooperate with the hook 32a, the engaging hole 33a and the recess 34a of the base 31, and the mounting operation can be performed in the same manner as the mounting operation as described above.

Thus, the operator inserts the hook protrusion 15a into the left side engaging hole 33a so as to engage the hook protrusion 15a with the engaging edge 33aa. He thereafter lowers the front end of the duct 10, so that the abutting protrusion 16a is brought to engage the recess 34a and that the left side engaging protrusion 14a is brought to engage the engaging claw 32aa of the hook 32a. The duct 10 is thus mounted on the left side of the base 31 as shown by chain lines in FIG. 1. In this left side mounting position, the opening 12 of the cutting chip suction nozzle 11 is positioned adjacent the cutting position, so that the cutting chips produced at the cutting position can be sucked by the nozzle 11 through the gap 21 formed between the base 31 and the left side plate 20d in the same manner as the right side mounting position. In addition, also with this arrangement, the nozzle 11 can suck cutting chips which have not been sucked by the nozzle 11 for the first time but have deposited on the base 31 after being scattered upward.

As described above, with the chip suction device of this embodiment, the chip suction duct 10 can be mounted on the jig saw on either of right and left sides of the blade B by a simple mounting operation. In addition, since the duct 10 is directly mounted on the upper surface of the base 31, the opening 12 of the nozzle 11 can be positioned adjacent the cutting position of the blade B. Therefore, the cutting chips produced at the cutting position can be sucked by the nozzle 11 before the cutting chips are scattered upwardly. In addition, even if some of the cutting chips have been scattered upwardly, they may be sucked when they are deposited on the base 31, so that the cutting chips can be efficiently sucked.

Furthermore, since the cutting chips are sucked immediately after the production at the cutting position, the cutting chips may not be scattered to the outside through the gaps 21 which have been created between the base 31 and the lower ends of the side plates 20d of the protector 20. Therefore, even if the vertical length of the gaps 21 is determined such that it is sufficient to permit the body 30 to be laterally inclined relative to the base 31 without causing interference with the protector 20, the cutting chips may not be scattered to the outside from the gaps 21. Thus, the cutting chip suction device of this embodiment is operable to effectively perform the cutting chip suction operation while the device does not cause interference with the oblique cutting operation. In addition, when the oblique cutting operation is performed, the duct 10 is positioned on the side opposite to the side of inclination of the body 30, so that the cutting chips can be effectively sucked by the duct 10.

While the invention has been described with reference to a preferred embodiment thereof, it is to be understood that modifications or variations may be easily made without departing from the spirit of this invention which is defined by the appended claims.

What is claimed is:

1. A cutting chip suction device for sucking chips produced when a work is cut by the blade of a cutting tool, the cutting tool having a body, a base for supporting the body, said body including means for mounting the blade on a front portion of the body and in a position on a substantially central line of the base, the base having a front portion with a recess through which the blade extends vertically, the suction device comprising:

a duct having one end connected to a dust collector and having the other end formed with an opening;

duct mounting means for mounting said duct on the base of the cutting tool;

said duct mounting means permitting said duct to be selectively mounted on the cutting tool in a first position one a first side of the blade and in a second position on a second side of the blade; and said opening of said duct in said first and second positions being positioned adjacent a cutting position where the work is cut by the blade;

the duct in said first and in said second position extends substantially in parallel with the central line of the base;

and wherein said duct has a front end including said opening, the position of the opening of said duct in said first position and the position of the opening of said duct in said second position confront each other on both sides of the blade as well as the recess.

2. The cutting chip suction device as defined in claim 1 wherein said opening of said duct is formed on a lateral side of said duct.

3. The cutting chip suction device as defined in claim 2 wherein said duct includes a suction nozzle having said opening and positioned on the lateral side of said duct, said suction nozzle extending substantially perpendicular to a longitudinal direction of said duct.

4. The cutting chip suction device as defined in claim 3 wherein said suction nozzle of said duct in said first and in said second position extends vertically obliquely relative to a longitudinal direction of the blade by an angle of about 45°.

5. The cutting chip suction device as defined in claim 1 wherein said duct mounting means includes front mounting means and rear mounting means, said front mounting means being operable to mount a front part of said duct on a front portion of the base, and said rear mounting means being operable to mount a part of said duct positioned away from said front part by a suitable distance on a rear portion of the base.

6. The cutting chip suction device as defined in claim 5 wherein said front mounting means and said rear mounting means cooperate with each other to permit said duct to be detachably mounted on the base both in said first and in said second position.

7. The cutting chip suction device as defined in claim 6 wherein:

said front mounting means includes a pair of hook members disposed on both sides of the front portion of the base in a symmetrical manner, and a pair of engaging members disposed on said duct and spaced from each other in a circumferential direction of said duct by a suitable distance, said engaging members being operable to engage corresponding hook members;

said rear mounting means includes a pair of engaging holes formed on both sides of the rear portion of the base in a symmetrical manner, and a pair of hook protrusions disposed on said duct in alignment with said engaging members and being operable to engage corresponding engaging holes;

said duct is fixed to the base in said first position when one of said engaging members is brought to engage the corresponding hook member in a snap-in manner after one of said hook protrusions positioned on the same side as one of said engaging members has been brought to engage the corresponding engaging hole;

said duct is fixed to the base in said second position when the other of said engaging members is brought to engage the corresponding hook member in a snap-in manner after the other of said hook protrusions has been brought to engage the corresponding engaging hole; and said duct is removed from the base when one or the other of said engaging members is disengaged from the corresponding hook member after said hook protrusion positioned on the same side as said engaging member has been disengaged from the corresponding engaging hole through resilient deformation of said front part of said duct by a pressing force applied by an operator.

8. A cutting chip suction device adapted for sucking cutting chips produced when a work is cut by a blade of a cutting tool, the cutting tool having a body, blade mounting means provided on the body, and a base for supporting the body to permit laterally inclined positions of the body, comprising:

a duct having one end connected to a dust collector and having the other end formed with an opening; and duct mounting means for mounting said duct on the base of the cutting tool;

said duct mounting means permitting said duct to be selectively mounted on the base in a first position and in a second position on both lateral sides of the blade;

the opening of said duct in said first and in said second position being positioned adjacent a cutting position where the work is cut by the blade;

with said duct in said first position, the body being permitted to be inclined rightward relative to the base, and with said duct in said second position, the body being permitted to be inclined leftward relative to the base.

* * * * *